United States Patent [19]
Wisnewski

[11] 3,857,688
[45] Dec. 31, 1974

[54] LEAD FILTER

[75] Inventor: John P. Wisnewski, Corpus Christi, Tex.

[73] Assignee: PPG Industries, Inc., Pittsburgh, Pa.

[22] Filed: Mar. 27, 1974

[21] Appl. No.: 455,468

Related U.S. Application Data

[63] Continuation-in-part of Ser. No. 192,848, Oct. 27, 1971, abandoned.

[52] U.S. Cl.............. 55/483, 55/484, 55/498, 55/502, 55/524, 55/DIG. 16, 55/DIG. 30, 55/DIG. 31, 60/311
[51] Int. Cl............................................ B01d 25/00
[58] Field of Search ............ 55/341, 342, 210, 482, 55/484, 498, 493, DIG. 30, DIG. 31, 502, DIG. 16, 520, 521, 522, 524, 483; 60/311; 210/494

[56] References Cited
UNITED STATES PATENTS

| | | |
|---|---|---|
| 2,788,901 | 4/1957 | Boddinghaus et al. ........... 55/482 X |
| 3,105,752 | 10/1963 | Bruce............................... 60/311 X |
| 3,129,078 | 4/1964 | Hobbs.............................. 60/311 X |
| 3,201,924 | 8/1965 | Fulfort et al..................... 55/498 X |
| 3,505,794 | 4/1970 | Nutter et al. .................... 55/521 X |
| 3,594,993 | 7/1971 | Heyse ................................. 55/524 |

Primary Examiner—Frank W. Lutter
Assistant Examiner—William Cuchlinski, Jr.
Attorney, Agent, or Firm—Robert DeMajistre

[57] ABSTRACT

Filter units for an automotive exhaust gas system are shown involving a cylindrical housing containing fiber glass filter paper elements. Means to pass gas through the filter paper and out of the unit are shown. The paper units are sealed to insure that all gases entering the filter cleaner are passed through the paper.

4 Claims, 3 Drawing Figures

PATENTED DEC 31 1974

LEAD FILTER

REFERENCE TO CROSS-RELATED APPLICATIONS

This application is a continuation-in-part of application Ser. No. 192,848, filed Oct. 27, 1971 now abandoned.

BACKGROUND OF THE INVENTION

Much concern has been expressed by federal and state governments as well as by industry in recent years in solving the problems of atmospheric pollution by the exhaust gas emissions of internal combustion engines and in particular the emissions in automobile exhaust gases. These emissions on a volume basis are primarily gases such as oxides of carbon, nitrogen oxides and unburned hydrocarbons. In addition, the use of leaded fuels in gasoline contributes lead particulates to automotive exhaust gases and the presence of these particulates in automotive exhaust gas have also become a matter of considerable concern by both industry and government. The concern of government appears to center on the question of whether or not these particulate lead emissions represent a health hazard; a question still apparently unresolved. The concern of industry over these particulates centers on their effect on catalytic muffler systems designed to reduce the gaseous emissions such as hydrocarbons, carbon monoxide and nitrogen oxide.

One obvious solution to the problem of lead particulate emissions is the removal of lead from gasoline. This has already resulted in legislation on state and federal levels limiting the quantities of lead in gasoline. Because of the unique nature of lead in gasoline and its beneficial properties in increasing gasoline octane values, its removal necessitates further refining of normal gasoline to produce gasolines with low lead that have adequate octane ratings for automotive use. The further processing of gasoline to compensate for lost lead tends to increase the price of gasoline and also results in a depletion of petroleum feed stocks, neither of these being desirable. Thus, an effective method of permitting leaded gasoline to continue to be used while eliminating lead particulate emissions is desirable so that low cost, high octane gasoline can still be utilized in automotive systems. Such a method will benefit the petroleum industry in that fuel reserves will not be reduced by producing super refined gasolines needed to supplant current high octane leaded fuels.

THE PRESENT INVENTION

In accordance with the instant invention, a novel method of treating exhaust gases and apparatus for this purpose have been provided which effectively remove particulate lead from the exhaust gases of internal combustion engines and automobile exhausts in particular. The method of the instant invention involves passing the exhaust gases at certain temperature conditions through a specially constructed filtering element which is absolute in filtering characteristics and is primarily a fiber glass mat having a binder associated therewith permitting the filler to operate at elevated temperature.

The invention will be more readily understood with reference to the accompanying drawings in which.

Figure 1:
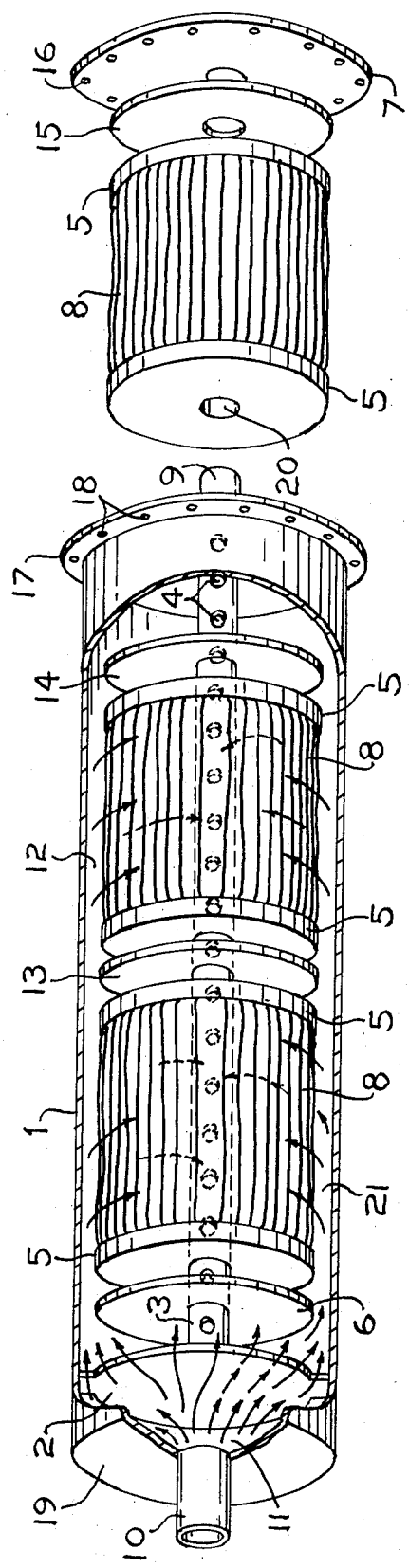
FIG. 1 is a cutaway perspective view showing an embodiment of the invention having a plurality of filtering elements sealed by gaskets interposing the faces of the filtering elements.

Referring now to FIG. 1, the filtering elements are contained in a tubular housing 1, typically of metal construction and stainless steel preferably. Centrally disposed along the long axis of the housing 1 is a support rod 3 which has a series of apertures 4 drilled in the upper portion thereof. An end plate 2 is provided on one end of rod 3 and spaced from the end wall 19 of the housing 1 to provide a chamber 11 at one end of the housing 1. A sealing member of gasket 6 is provided between end plate 2 and the first filter element 8 shown in the drawing. Filter elements 8 (three are shown in the drawing) have a central aperture 20 so that they can slide onto the support member or rod 3. Each end of each filter element has a metal cap; the cap may also be constructed of fiber glass paper. The main body of the element 8 consists of convoluted fiber glass paper 8 which is arranged in circular fashion to provide the central aperture 20 and a second gas space 21 between the outer surface of the paper and the housing 1. As shown in the drawing, reading it from left to right, the filter units 8 are placed so that end cap 5 of the first unit abuts gasket 6 which is sealed to end plate 2 when the unit is assembled and closed. Between this filter element and the next one is a gasket 13, preferably of fiber glass paper which seals end cap 5 of the first unit against the end cap 5 of the next adjacent unit. Similarly between the second filter element 8 and the third unit another fiber glass paper gasket 14 is placed to seal end cap 5 of the second unit against end cap 5 of the third unit. A final gasket 15 is provided to seal the back end cap 5 of the third unit to end plate 7. End plate 7 is designed to engage the flange 17 at the end of housing 1 and bolts and nuts are used in holes 16 of end plate 7 and holes 18 of flange 17 to secure plate 7 to the housing 1.

In operation gases are fed to the filter housing 1 through the inlet 10 and enter chamber 11. The gases pass across the plate 2 to the gas space 21 in housing 1. The gases then pass through the paper 8 to the apertures 4 in support rod 3 which are all covered by the paper when the unit is assembled. The filered gases pass from the housing 1 to the outside via exhaust conduit 9.

While in the drawing the filter elements 8 have been shown as three in number, this is for convenience only. The elements 8 can be a single unit or they can comprise any convenient number of these elements. When multiple units are employed, the inclusion of a gasket or gas tight seal between them is important to insure that gases do not reach the apertures 4 without passing through the filter element 8.

The filter element of this invention typically operates on gas streams having temperatures in the range of 300°F. up to 500°F. The fiber glass paper 8 is therefore treated to provide a binder thereon that permits operation at these temperatures.

A particularly acceptable binder for this purpose is a benzophenone dianhydride-metaphenylene diamine reaction product in a solvent of ethanol-N-methyl-2- pyrrolidone on a 30 to 70 percent volume basis ethanol to to n-methyl pyrrole. Other solvents for the reaction product used may be dimethylacetamide, dimethylforamamide, dimethylsulfoxide and pyridine. In lieu of metaphenylenediamine other aromatic diamines such as 4,4-diaminophenyl ether may be used.

In applying the binder to the fiber glass the reaction product of the dianhydride diamine in its carrier solvent is made water soluble by adding it to or adding to it, water containing a member of the group consisting of alkali metal hydroxides and ammonium hydroxide. Typical alkali metal hydroxides are sodium, potassium and lithium hydroxide. Ammonium hydroxide is preferred. Thus, in the preferred embodiment a benzophenone dianhydride-metaphenylene diamine reaction product in ethanol-N-methyl-2-pyrrolidone solvent is added to an aqueous ammonium hydroxide solution. Typically on a weight basis the solution is about 1 percent ammonium hydroxide and the dianhydridediamine with its solvent media is about 8 percent.

The fiber glass fibers are slurried and vacuum drawn on conventional paper making equipment to form the fiber glass paper. After drying, the fiber glass paper is dipped in the aqueous solution containing the high temperature polyimide prepolymer binder and subsequently dried. The fiber glass paper is normally folded in the desired shape prior to application of the binder.

Thus, in the preferred preparation, the fiber glass paper to be used in the filter element 8 is folded in the shape shown in the drawing and dipped in the ammoniacal water solution containing the dianhydridediamine reaction product. After thorough wetting the paper is dried, typically in an oven at about 300°F. for one hour. The fiber glass filter paper is then cured at 600°F. for about four hours to form a strongly adherent polyimide binder on the fiber glass in the paper. While it is preferred to operate the process of applying binder from an aqueous solution, this is not a critical feature of application since the organic solvents in which the dianhydride-diamine reaction product are present may also be used as the vehicle to apply the binder to the fiber glass. Water solutions are preferred because of the ease of handling, the ability to uniformly apply the binder and the safety involved in its use over solvents which may be noxious or flammable.

In a specific application a benzophenone dianhydride-phenylene diamine (Skybond 700) sold by Monsanto Company was prepared for binding fiber glass paper by forming a bath containing 891.18 grams of $H_2O$, 7.47 grams of Skybond and 1.35 grams of ammonium hydroxide. The fiber glass paper was folded in the desired shape and dipped in the bath containing these ingredients in these proportions and air dried for one hour at 300°F. The paper was then oven cured at 600°F. for 4 hours. The fiber glass papers were formed in the configuration shown in the drawing in elements 8 and were bound at each by metal caps 5. In the case where fiber glass caps are used, the same binder would be applied in the above manner.

Three filter elements 8 prepared in this manner were assembled on the spindle support member 3. The plate 7 was attached to the end plate 17 of the filter 1 and firmly seated with bolts and nuts. A gasket member 15 provided an airtight seal at this end of the device. Two filters assembled in this manner were connected to the exhaust system of a 1970 four door Impala Chevrolet sedan. The filters had a cyclone (not shown) placed in front of each one to remove particles above 2 microns in size. The car was driven for a distance of 9,000 miles. The operating conditions of the automobile during the test period were varied since the automobile was operated under normal driving conditions. Thus, the car operated at high speeds, low speeds and in-town traffic. After accumulating a total mileage on the car of 9,000 miles, the filter units were removed from the automobile and examined for thermal stability and lead particulate trapping. Based on the average lead content of the gasoline utilized during the test period and the total quantity of lead collected in the cyclone and the filter, it was estimated that the lead removal amounted to an efficiency in trapping lead of 97 percent.

The use of a fiber glass filter of the absolute type (rated at greater than 99.9 percent removal of particles above 0.3 micron in size) has thus resulted in the effective removal of all particulate lead above 0.3 micron in size as well as all other particulates in this size range. Tests in which exhaust gas from pipe 9 is passed through subsequent absolute filters (i.e., filters designed to trap all particles above 0.3 micron) show the gases removed from the filter to be lead free in this size range.

Many modifications may be made without departing from the spirit of the instant invention. Thus, while the gaskets 6, 13, 14 and 15 shown have been preferably constructed of fiber glass with an appropriate binder for operation at temperature of 300°F. to 500°F., other gasket material may be used which will operate at these temperatures and provide the gas tight seal. Similarly caps 5 can be constructed of teflon, other like material which is gas tight and operative in the temperature range of filter operation.

Figure 2:
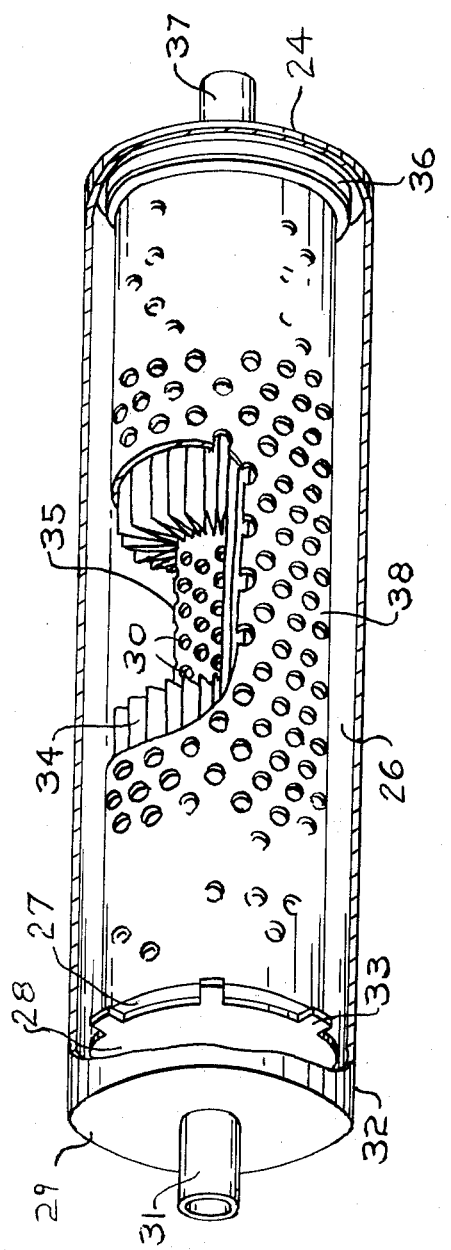
FIG. 2 is a cutaway perspective view showing an embodiment of the invention having a single filtering element.

Referring now to FIG. 2, the filter element is contained in a tubular housing 32 typically of metal construction and stainlesss steel preferably. Centrally disposed along the long axis of the housing 32 is a support member 35 which has a series of apertures 30 stamped therein. An end plate or baffle member 33 is provided on one end of the support member 35 and spaced from the end wall 29 of the housing 32 to provide a chamber 28 at one end of the housing 32. The end plate or baffle 33 and the filter element 34 are permanently affixed to each other. The filter element 34 has a metal cap 27 which is permanently affixed by welding or a like technique to the baffle member 33. The main body of the filter element 34 is composed of convoluted fiber glass paper disposed in circular fashion about the central apertured support member 35, thus providing a second gas space 26 between the outer surface of the filter element 34 and the housing 31. At the end of the filtration apparatus, opposite the baffle member 33, a second end cap 36 is provided which is permanently affixed by welding or like technique to end plate 24. On the end plate 24 is mounted the exhaust outlet 37. About the entire filter element 34 is wrapped an apertured sleeve 38 which is mounted on the end caps 27 and 36. This apertured sleeve is preferably constructed of metal which lends support to the filter element 34. Thus, when the end plate 24 is disconnected from the housing 32, the entire internal filtration apparatus can be removed from the housing thus permitting disposal of the spent element 34 and replacement of a new element 34 in the housing 32.

The end caps 36 and 27 are affixed to the filter element 34 by means of a high temperature adhesive sealant. When this adhesive sealant is capable of bonding to both the fiber glass and the metal, a gas tight seal having mechanical stability is obtained. However, due to the mechanical stresses and high tempertures involved in the operation of the apparatus of the invention, ceramic adhesive compositions have been utilized to bond the glass fiber paper to the metal end cap. Because ceramic adhesives bond to metal with great difficulty, it is desirable to provide perforated discs welded onto the interior of the metal end cap which provide a mechanical seal between the metal cap and the ceramic adhesive composition and also provide structural reinforcement to the cured ceramic adhesive sealant.

In operation, gases are fed into the filter housing 32 through the inlet 31 and enter the chamber 28. The gases pass across the plate or baffle member 33 to the gas space 26 in the housing 32. The gases then pass through the apertured sleeve 38 and through the glass fiber paper element 34 to the apertures 30 in the support rod 35 which is completely enclosed by the glass fiber paper 34. The filtered gases pass from the housing to the outside via exhaust conduit 37.

Because the operating temperatures of the gas streams are between 300°F. to 500°F. as in the apparatus of FIG. 1, and in some cases up to 1,000°F., the fiber glass paper element 34 has a binder thereon capable of withstanding these high temperatures. Such binders useful up to 1,000°F. are composed of colloidal silicas such as Positive Sol 130M manufactured by Du Pont.

The apparatus described in FIG. 2 is installed on a 1974 Ford Pinto having a 2,300 cubic centimenter displacement. Testing of the exhaust gases shows effective removal of substantially all of the lead particulates from the exhaust gases.

Figure 3:
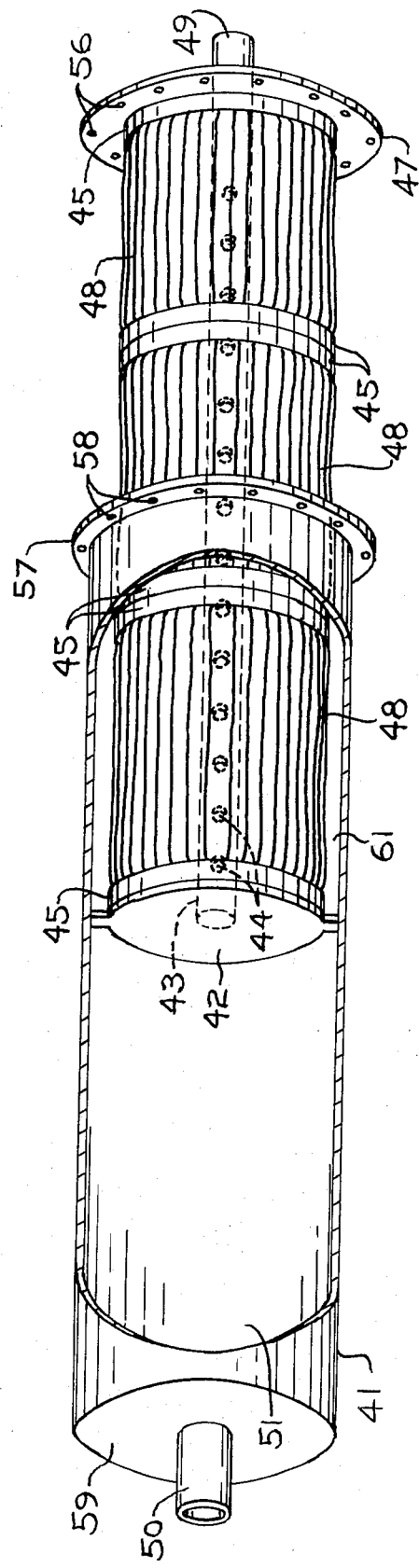
FIG. 3 is a cutaway perspective view showing an embodiment of the invention having a plurality of filter elements permanently affixed to each other.

Referring now to FIG. 3, which shows a filter having a plurality of filter elements permanently affixed to each other within a housing, the filter elements are contained in a tubular housing 41, typically of metal construction and stainless steel preferably. Essentially disposed along the long axis of the housing 41, is a support rod 43 which has a series of apertures 44 stamped in the upper portion thereof and end plate 42 is provided on one end of the rod 43 and spaced from the end wall 59 of the housing 41 to provide a chamber 51 at one end of the housing 41. End plate 42 is fixedly attached to the first filter element 48 shown in the drawing by means of a weld connection between the baffle or plate 42 and the end cap 45. The end cap 45 is of metal construction, preferably steel. In this embodiment there are shown three filter elements. The end of each filter element 48 has a metal cap 45 and the main body of the element 48 consists of convoluted fiber glass paper 48 which is arranged in circular fashion about an apertured support member 43. The arrangement of the filter elements 48 within the housing 41 provides a second gas space 61 between the outer surface of the paper 48 and the housing 41. As shown in the drawing, reading it from left to right, the filter units 48 are placed so that the end caps 45 thereof abut each other and are sealed by being welded together so that the gases cannot penetrate between the elements 48; therefore, all the gases must pass through the glass fiber paper 48. The last filter element 48 is welded to the end plate 47 by means of its end cap 45. End plate 47 is designed to engage the flange 57 at the end of the housing 41 and bolts and nuts are used in holes 56 of end plate 47 and holes 58 of flange 57 to secure plate 47 to the housing 41.

In operation, gases are fed to the filter housing 41 through the inlet 50 and enter chamber 51. The gases pass across the plate 42 to the gas space 61 in the housing 41. The gases then pass through the paper 48 into the apertures 44 in support rod 43 which are covered by the paper. Filtered gases pass from the housing 41 to the ouside via exhaust conduit 49.

The filter element in this embodiment of the invention operates within the temperature ranges of the embodiments described in FIGS. 1 and 2. Therefore, the glass fiber paper 48 has a binder thereon that permits operation at these temperatures. This binder and its application to the glass fiber paper has been previously described in FIGS. 1 and 2.

The apparatus of FIG. 3 was installed on a 1973 Chevrolet Impala having 350 cubic inch displacement. Testing of the exhaust gases showed effective removal of substantially all of the lead particulates therefrom.

Thus, while the invention has been described with reference to certain specific illustrated embodiments, this is not to be construed as limiting the invention except insofar as appears in the accompanying claims.

I claim:

1. A fiber glass filter comprising:
a gas impermeable cylindrical housing,
a first end plate mounted within said housing and spaced from the inner surface therof acting as a baffle at one end thereof,
a second end plate mounted in closing relationship to the opposite end of said housing,
a centrally disposed, apertured, hollow cylindrical support member traversing the substantial length of said housing, extending to the exterior of said housing through said second end plate, and being supported by said first and second end plates,
a filtration zone, having therein glass paper, said glass fiber paper being mounted concentrically within and spaced from the inner surface of said housing on said apertured support member,
sealing end caps on said filter paper,
means for sealing said gas fiber paper, and said first and second end plates into a unitary structure which causes gases introduced into said filter to pass through said glass fiber paper,
the interior of said housing and the exterior of said glass fiber paper providing a gas space,
means for introducing gases into said housing and said gas space, and
means for discharging gases from said housing through said support member.

2. The fiber glass filter of claim 1 wherein said filtration zone further comprises a plurality of fiber glass filter paper elements mounted on said apertured support members.

3. The fiber glass filter of claim 2 wherein said means for sealing comprises glass fiber paper gaskets contacting the opposing end caps of each of said filter elements and contacting the surface of each of said end plates and the end caps proximate thereto.

4. The fiber glass filter of claim 2 wherein said means for sealing comprises weld joints permanently affixing, in a gas impermeable manner, the opposing end caps of each of said filter elements and the surface of each of said end plates and the end caps proximate thereto.

* * * * *